(12) United States Patent
Stolin (10) Patent No.: US 6,175,844 B1
(45) Date of Patent: Jan. 16, 2001

(54) ORDERING GROUPS OF TEXT IN AN IMAGE

(75) Inventor: Jacob Stolin, Cupertino, CA (US)

(73) Assignee: Adobe Systems Incorporated, San Jose, CA (US)

( * ) Notice: Under 35 U.S.C. 154(b), the term of this patent shall be extended for 0 days.

(21) Appl. No.: 09/000,898

(22) Filed: Dec. 30, 1997

Related U.S. Application Data

(63) Continuation-in-part of application No. 08/864,993, filed on May 29, 1997, now abandoned.

(51) Int. Cl.[7] .................................................. G06F 17/21
(52) U.S. Cl. .......................................... 707/521; 382/180
(58) Field of Search ........................... 382/180, 173–179; 707/500, 501, 517, 519, 520, 521, 524, 530, 531, 539, 513

(56) References Cited

U.S. PATENT DOCUMENTS

| | | | |
|---|---|---|---|
| 4,935,877 | * | 6/1990 | Koza ...................................... 706/13 |
| 5,185,813 | * | 2/1993 | Tsujimoto ............................. 382/180 |
| 5,666,469 | * | 9/1997 | Lee ......................................... 706/46 |
| 5,669,007 | * | 9/1997 | Tateishi ................................ 707/517 |
| 5,955,322 | * | 9/1999 | Guarnieri et al. ................... 435/91.1 |

OTHER PUBLICATIONS

Saitoh et al, "Document Image Segmentation and Text Ordering", Proceedings of the Second International Conference on Document Analysis and Recognition, pp. 323–329, 1993.*

Hao et al, "Nested Segmentation: An Approach for Layout Analysis in Document Classification", Proceedings of the Second International Conference on Document Analysis and Recognition, pp. 319–322, 1993.*

Taylor et al, "An Intelligent Document Understanding System", Proceedings of the Second International Conference on Document Analysis and Recognition, pp. 107–110, 1993.*

Belaid et al, "A Labeling Approach for Mixed Document Blocks", Proceedings of the Second International Conference on Document Analysis and Recognition, pp. 749–752, 1993.*

Itonori, "Table Structure Recognition Based on Textblock Arrangement and Ruled Line Position", Proceedings of the Second International Conference on Document Analysis and Recognition, pp. 765–768, 1993.*

Iwane et al, "A Functional Classification Approach to Layout Analysis of Document Images", Proceedings of the Second International Conference on Document Analysis and Recognition, pp. 778–781, 1993.*

Ito et al., "Field Segmentation and Classification in Document Image," Proceedings of the 6th International Conference on Pattern Recognition, Munich, pp. 492–495, vol. 1, Oct. 19–22, 1982, IEEE.

Balestri et al., "A Method for The Correct Ordering of Typewritten Lines," Signal processing: Theories and Applications, Grenoble, Sep. 5–8, 1988, vol. 3, pp. 1609–1611.

ExperVision, TypeReader User's Guide, Chapter 7: Locating, Text Regions, and Templates, pp. 71–90 (Jun. 1992).

* cited by examiner

Primary Examiner—Joseph H. Feild
(74) Attorney, Agent, or Firm—Fish & Richardson, P.C.

(57) ABSTRACT

Method and apparatus for recognizing and ordering text in an image stored in a computer. The text is grouped into multiple blocks, with the text blocks represented as a graph having vertices and edges based on proximity and characteristics of the text blocks to each other. An optimal Hamiltonian path through the vertices is calculated, and the text blocks are ordered according to the calculated optimal Hamiltonian path.

24 Claims, 9 Drawing Sheets

ORDERING GROUPS OF TEXT IN AN IMAGE

CROSS REFERENCE TO RELATED APPLICATIONS

This application is a continuation-in-part of U.S. Ser. No. 08/864,993, filed May 29, 1997, entitled "ORDERING GROUPS OF TEXT IN AN IMAGE" now abandoned.

BACKGROUND

The invention relates to ordering groups of text in an image.

Paper documents can be scanned and stored as images in a computer. Text recognition techniques, such as optical character recognition (OCR), can then be used to convert text in these images to a computer-editable format, such as ASCII characters. Scanned images can contain text organized in multiple, distinct blocks (e.g., multiple columns of text, headlines, captions, footnotes, footers). The text blocks may further be separated by relatively large areas of blank space and graphical objects (lines, pictures, and so forth). Text can also be surrounded by a frame or contain insets, which further separate the text into blocks. Although a person reading the page may be able to recognize the proper order of the text blocks in the image, it may be difficult for an OCR program to identify the text (by discarding the non-text components such as blank spaces and graphical objects) and then group the text into the proper reading order.

SUMMARY

In general, in one aspect, the invention features a computer-implemented method of ordering text in an image stored in a computer. Text is grouped in multiple regions. The text regions are represented as a graph having vertices and edges. An optimal Hamiltonian path through the vertices is calculated, and the text regions are ordered according to the calculated optimal Hamiltonian path.

Implementations of the invention may include one or more of the following features. The representing step includes defining each group of text as a vertex in a graph, defining edges between the vertices, and assigning weights to the edges. Directed pairs of edges are defined between any two vertices. An optimal Hamiltonian path through the vertices is calculated based on the assigned edge weights by solving a traveling salesman problem. The weights assigned the edges between the vertices are based on the distance between any two text regions, the characteristics of the corresponding text regions, and the existence of non-text separators between text regions.

In general, in another aspect, the invention features a program residing on a computer-readable medium for ordering text in an image stored in a computer. The program includes instructions for causing the computer to group the text in multiple regions and to represent the text regions as a graph having vertices and edges. The text regions are ordered according to a calculated optimal Hamiltonian path through the vertices.

In general, in another aspect, the invention features an apparatus for recognizing text in an image that includes a storage medium to store the image and a processor operatively coupled to the storage medium. The processor is configured to group the text in multiple regions and to represent the text regions as a graph having vertices and edges. Further, the text regions are ordered according to a calculated optimal Hamiltonian path through the vertices.

The invention has one or more of the following advantages. The proper order of multiple, distinct blocks of text in a captured image can be determined reliably by a text capture program.

Other features and advantages of the invention will become apparent from the following description and from the claims.

BRIEF DESCRIPTION OF THE DRAWINGS

FIG. 2b is a diagram of vertices representing the text blocks of FIG. 2a.

DETAILED DESCRIPTION

Figure 1:
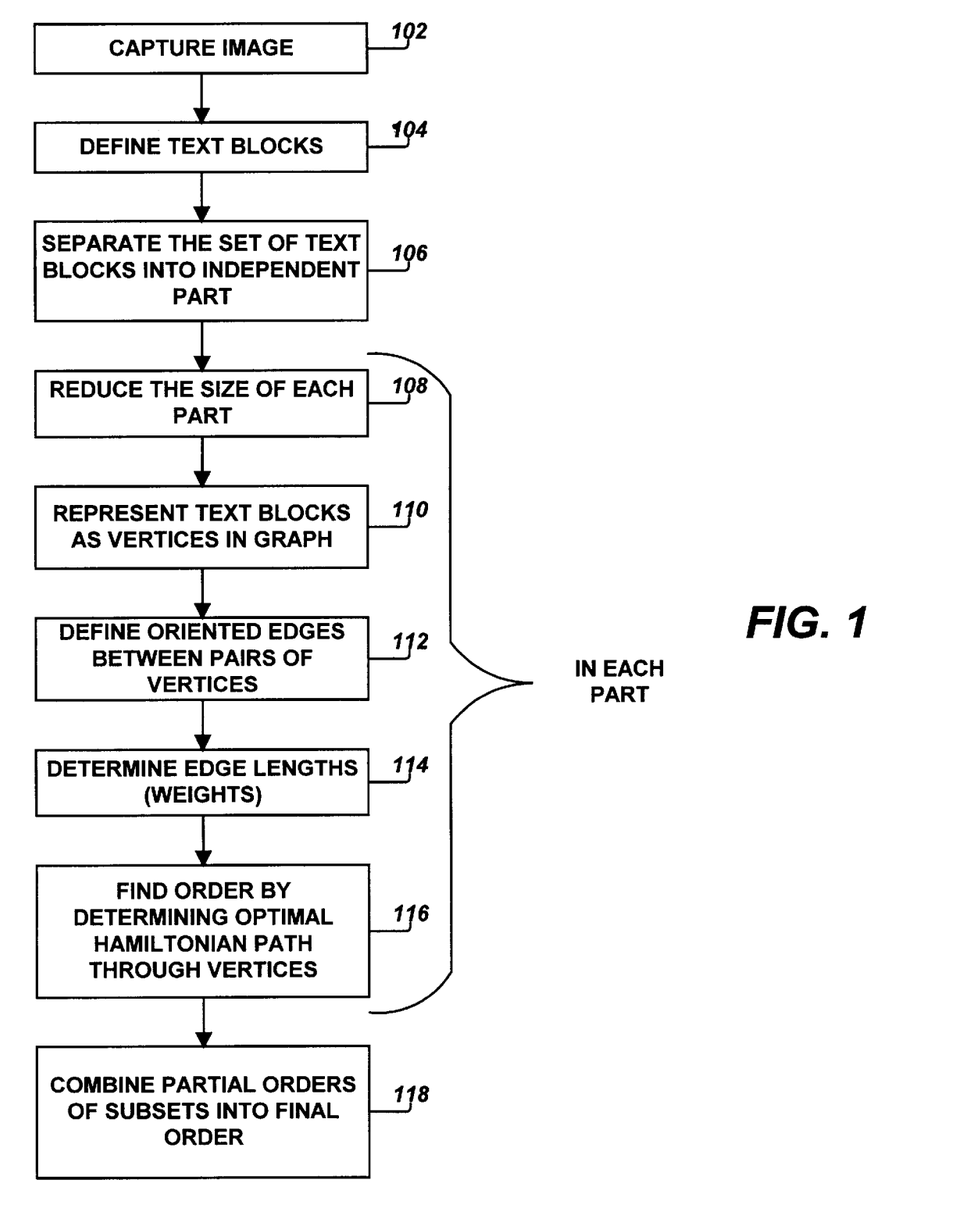
FIG. 1 is a flow diagram of a text capturing and ordering program in accordance with the present invention.

Referring to FIG. 1, a computer implemented text capturing program is described that can reliably identify the proper order of text grouped into multiple, distinct blocks in an image. The program first captures and stores an image (step 102). Next, the program identifies the text blocks in the page based on conventional page layout analyses (step 104). For example, the image can be represented as density histograms, with very dense regions indicating non-text objects, such as graphical objects, and very sparse regions indicating gaps. Alternatively, the identification of text blocks can also be based on such factors as the proximity of the text blocks to each other, font size, and the existence of space separators and blocks of graphical objects. Thus, for example, although text characters in a page may be horizontally aligned, they may be separated by a wide gap, indicating that the characters are located in two different columns. In addition, the section heading for the page of text may have a different, larger font than the remaining text. The text characters may also be separated by graphical objects interspersed throughout the page.

After the text blocks have been identified in the image, the program separates the text blocks into independent subsets or parts of the page, if possible (step 106). Many pages can be divided into smaller parts that are divided by certain types of separators. These independent parts can be processed separately by the program, thereby reducing the complexity of finding the order of the text blocks in a page. Steps 108–116 in FIG. 1 are performed separately for each identified independent part of the page.

To further reduce the complexity of finding the order of the text blocks in each part of the page, the program next combines text blocks where possible (step 108). Often there is only one way to order two or more text blocks. In such cases, the blocks can be combined into a new single text region.

Figure 2A:
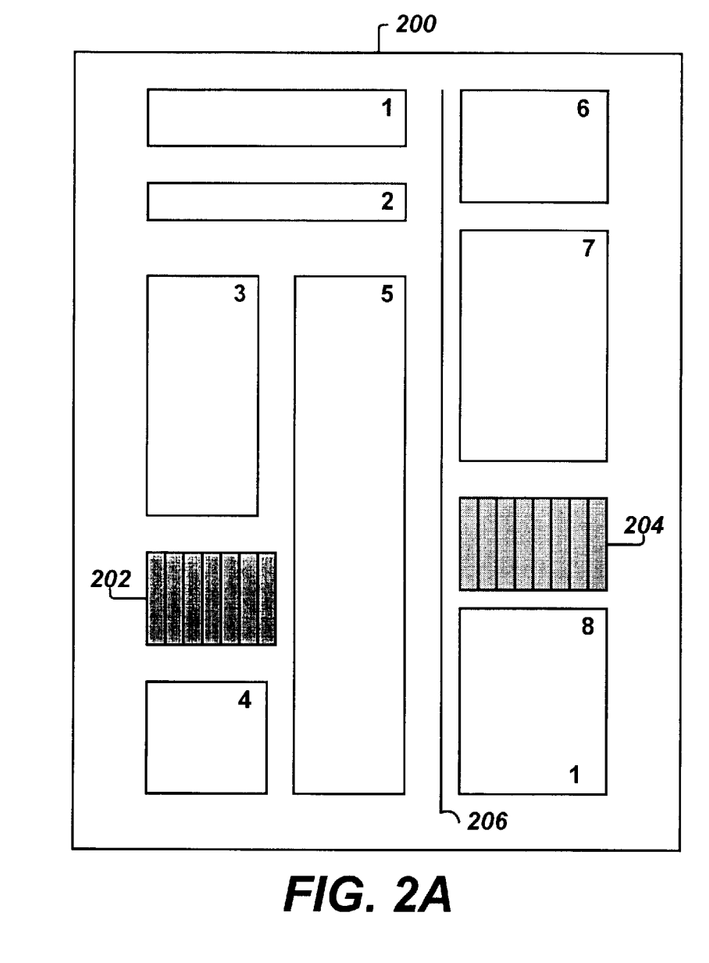
FIG. 2a is a diagram of text in an image separated into blocks.
Figure 2B:
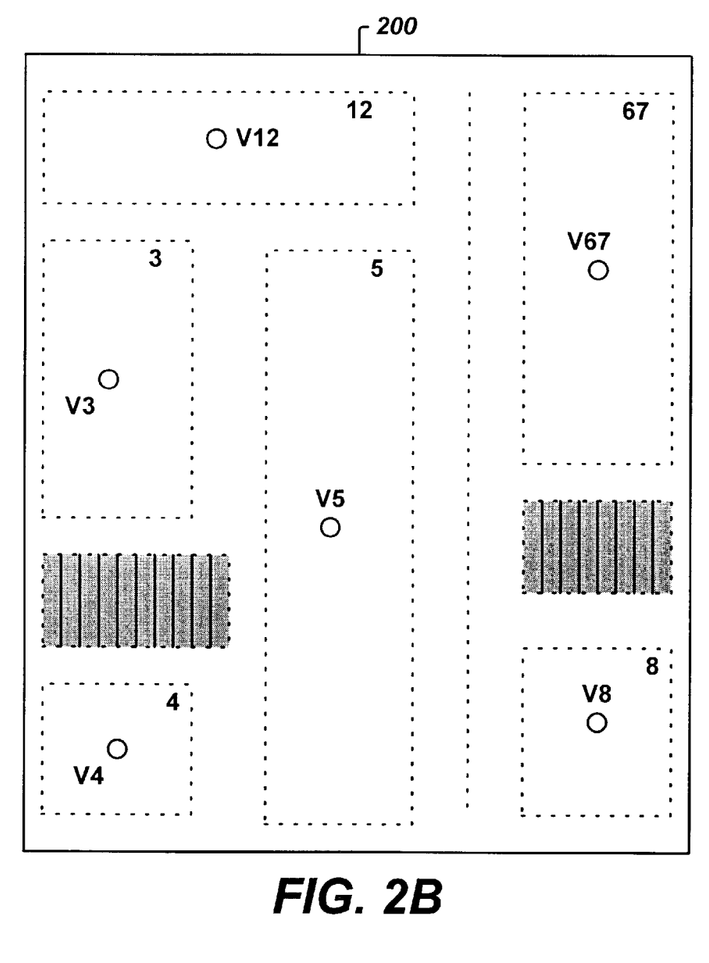

In the exemplary part 200 of a page in FIG. 2a, the darkened boxes 202 and 204 correspond to non-text objects, such as graphical objects. Further, a vertical divider line 206 separates text. In this image, the identified text blocks are labeled as text blocks 1–8. In each page part, the program then designates each text region (a region can be one text block or a group of combined text blocks) as a vertex of a graph (step 110). In FIG. 2a, text blocks 1 and 2 can be combined into one text region 12 and text blocks 6 and 7 can be combined into one text region 67. Thus, in FIG. 2b, vertices $V_{12}$, $V_3$, $V_4$, $V_5$, $V_{67}$, and $V_8$ are designated for the text regions in FIG. 2a. The positions of the vertices are not necessarily geometrically related to the locations of the text blocks 1–8 in the image 200.

Next, the program defines directed edges $(V_i, V_j)$ and $(V_j, V_i)$ for each pair of vertices $V_i$ and $V_j$ (step 112). A pair of directed or oriented edges is defined between any two vertices because of the possibility that, as between any two text regions, one text region may come before the other text region. The vertices $V_{12}$, $V_3$, $V_4$, $V_5$, $V_{67}$, and $V_8$ along with the directed edges between each of the vertices define a directed or oriented graph G, as shown in FIG. 3.

The relationships between the vertices V are then defined (step 114) by assigning edge lengths (or weights) to the directed edges $(V_i, V_j)$ and $(V_j, V_i)$, based on a number of factors. These factors include the distance between any two text blocks, the characteristics (e.g., number of lines, font size, spacing) of two text blocks, and the existence of separators (such as empty space or other non-text objects) between the text block pairs. The edge lengths are based on the likelihood that one vertex $V_i$ comes before its adjacent vertex $V_j$. The higher the likelihood that text region i comes before text region j, the smaller the weight of edge $(V_i, V_j)$, and vice versa.

Figure 3:
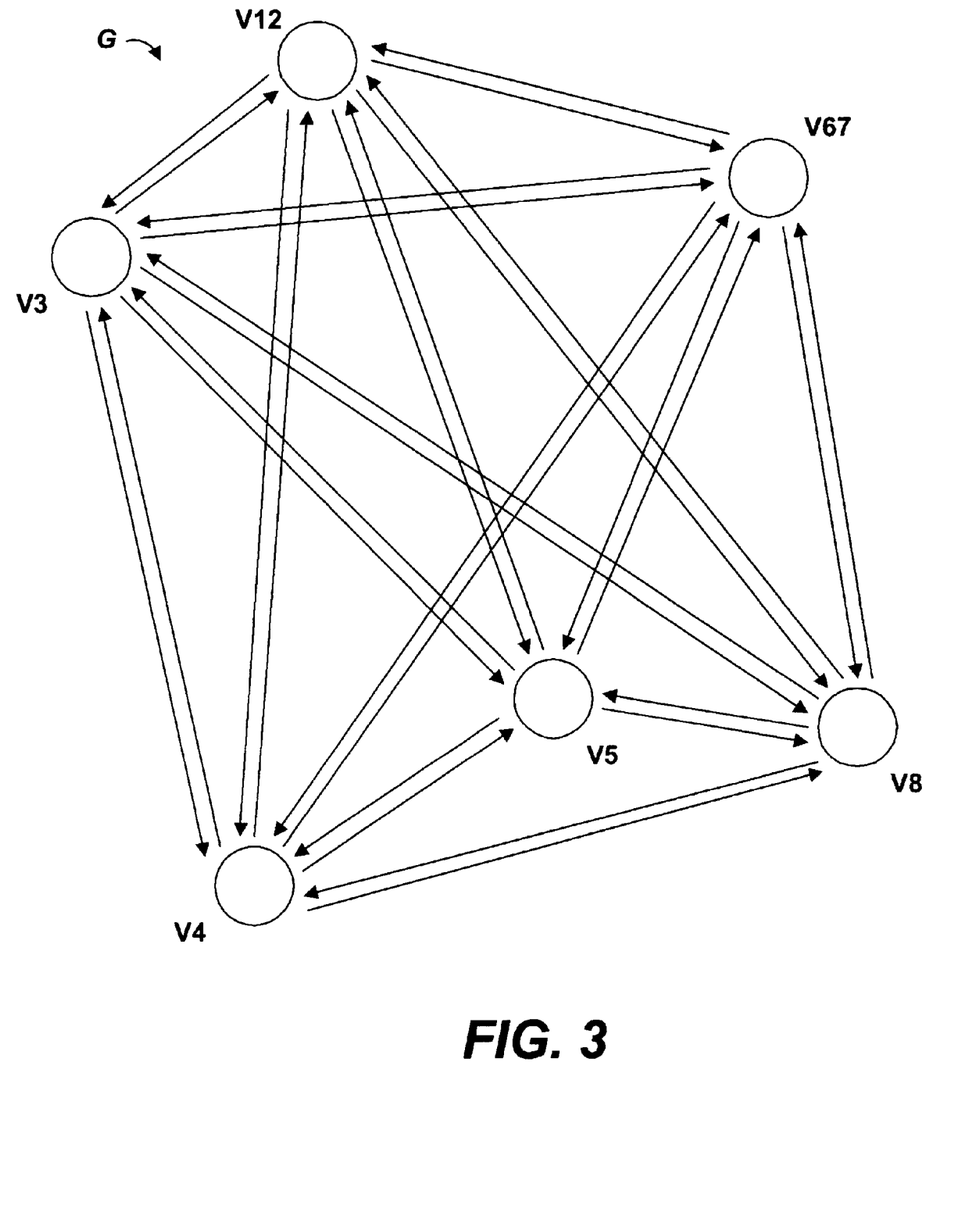
FIG. 3 is a graph containing the vertices corresponding to the text blocks of FIG. 2a along with oriented pairs of edges adjacent any two vertices.

Thus, for example, in FIG. 3, the weight assigned to the edge $(V_{12}, V_3)$ is much smaller than the weight assigned the edge $(V_3, V_{12})$ because it is much more likely that text region 12 comes before text region 3.

Figure 4:
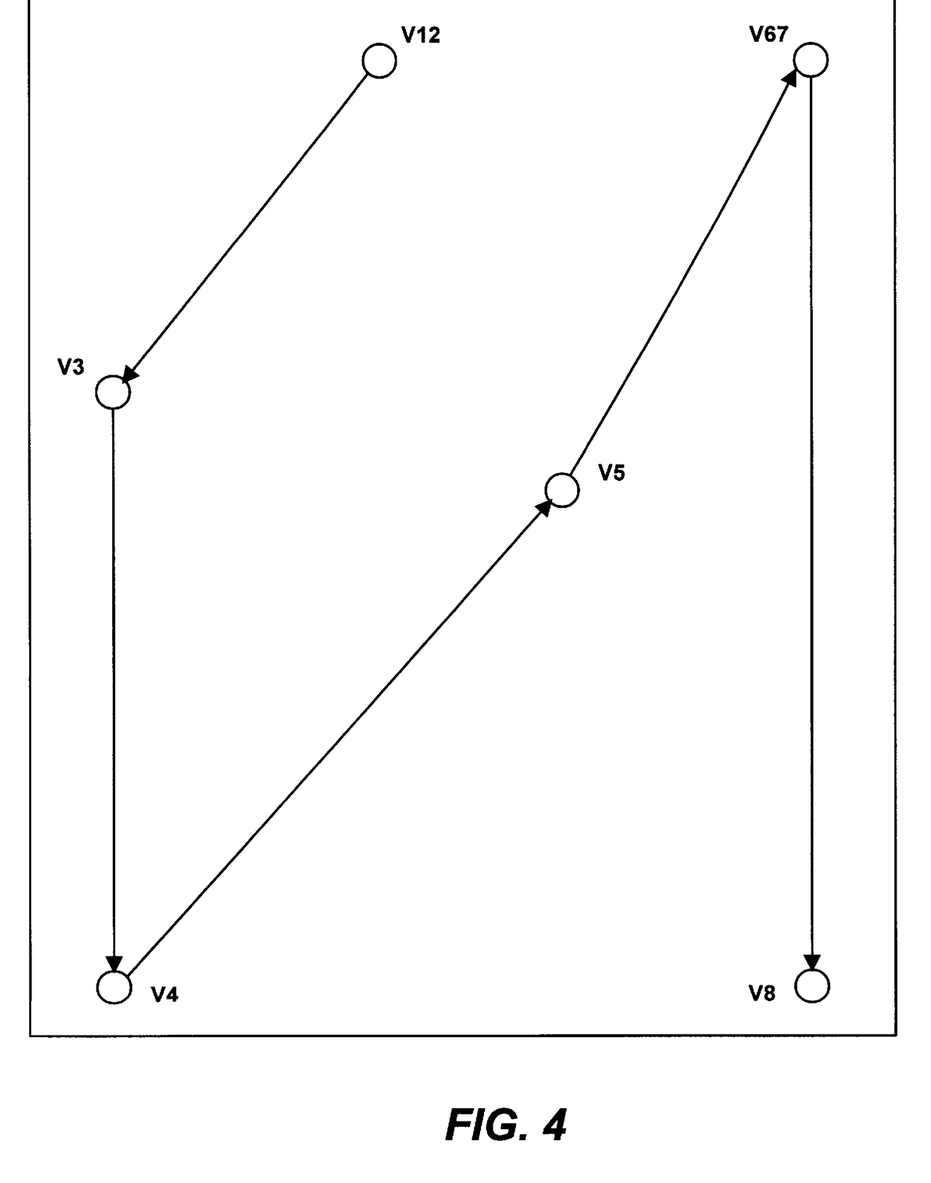
FIG. 4 is a diagram of an optimal Hamiltonian path through the vertices in the graph of FIG. 3.

Next, using the weights determined for the edges of the graph, the program finds an optimal Hamiltonian path through the vertices $V_{12}$, $V_3$, $V_4$, $V_5$, $V_{67}$, $V_8$ by using brute force (for small graphs) or conventional heuristic or approximate methods that solve a traveling salesman problem (step 116). An identified optimal Hamiltonian path is shown in FIG. 4, with the path starting at $V_{12}$ and continuing to vertices $V_3$, $V_4$, $V_5$, $V_{67}$, and $V_8$ successively. Next, the program combines the partial orders found for the corresponding parts of the page into a final order π (step 118).

Figure 5:
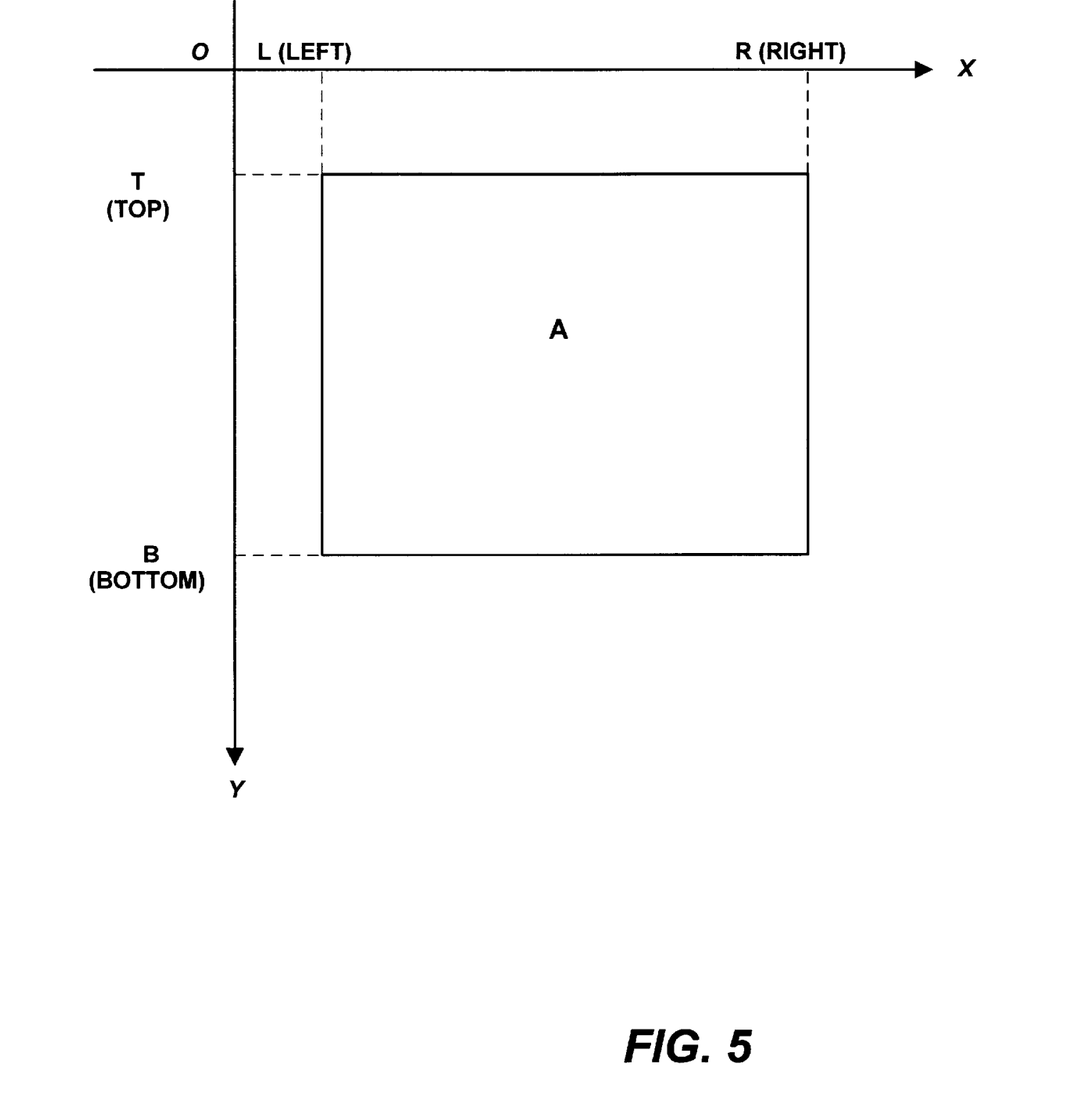
FIG. 5 is a diagram of a text block.

The following mathematical model is defined to perform the text ordering process. Referring to FIG. 5, for a text region A with coordinates (T,B,L,R) in a two-dimensional X-Y space, let $$\text{Top}(A)=T,$$
$$\text{Bot}(A)=B,$$
$$\text{Lft}(A)=L,$$
$$\text{Rgt}(A)=R, \quad \text{(Eq. 1)}$$

and $$\text{CntrX}(A)=(L+R)/2,$$
$$\text{CntrY}(A)=(T+B)/2, \quad \text{(Eq. 2)}$$

where L and R are on the X axis and T and B are on the Y axis. The distance between any two text regions A1 and A2 is defined as $$|A1,A2|=\text{CntrX}(A1)-\text{CntrX}(A2)|+|\text{CntrY}(A1)-\text{CntrY}(A2)| \quad \text{(Eq. 3)}$$

For each pair of text regions Ai, Aj, a precedence function f(Ai,Aj) is constructed so that, the more likely Ai precedes Aj, the smaller is the value of f(Ai,Aj). For K text regions, the precedence functions f(Ai,Aj), i=1–K, j=1–K, i≠j, are calculated, which are used to calculate the edge lengths or weights between vertices.

However, before the precedence functions f(Ai,Aj) are constructed, the complexity of the problem is reduced (1) by separating the page into different parts; and (2) by combining text blocks into regions, where possible.

Figure 6:
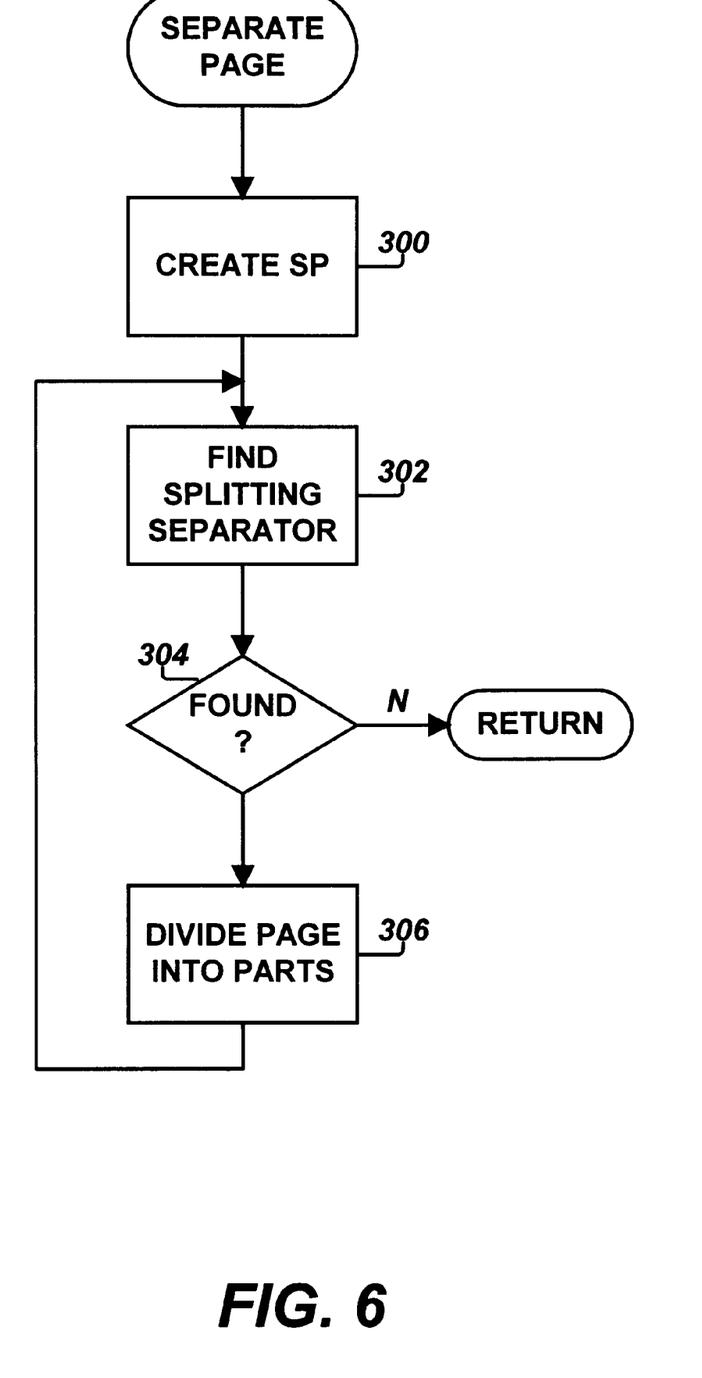
FIG. 6 is a flow diagram of a process for separating a page into independent parts.

Referring to FIG. 6, the step 106 of splitting the page into multiple parts is described. A page can be split into independent parts by applying the following recursive algorithm. The program creates a set SP of page parts $P_i$ and initiates it by defining the whole page as the element of the set SP (step 300). For each element in SP, the program looks for a splitting separator going through the existing element (step 302), where a splitting separator may be defined as any non-text region except a thin vertical line, which might be a column separator. If no splitting separator is found (step 304), the process is stopped. If a splitting separator is found, the current element is divided into 2 new sub-elements by splitting it along the selected separator (step 306). The current element is replaced by two new sub-elements and steps 302–306 are repeated. The sub-elements form the parts $P_i$ of the page. Thus SP={$P_1, P_2, \ldots, P_n$}, and the text ordering process is performed independently on each part $P_i$, with the results for each part combined at the end to determine the final order π.

Figure 7:
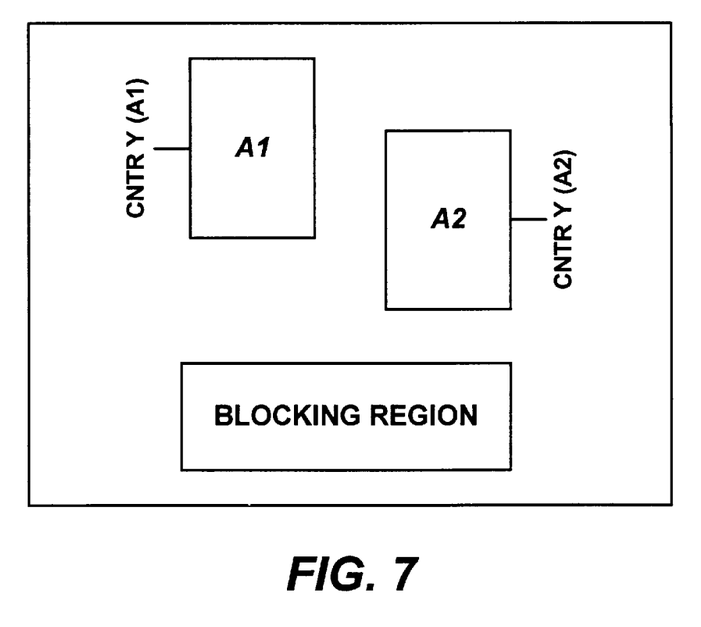
FIGS. 7, 8, and 9 are diagrams of text blocks in page parts.

To reduce the complexity in each page part, two or more text blocks or regions can be combined (step 108) if they are "horizontally connected" or "vertically connected." Two text regions A1, A2 are called horizontally connected (see FIG. 7) if the following conditions are true:

(1) A1 and A2 are horizontally aligned, that is, max(Top(A1),Top(A2))<min(CntrY(A1),CntrY(A2)), and min(Bot(A1),Bot(A2))>max(CntrY(A1),CntrY(A2));

(2) no other region overlaps a common bounding box of A1 and A2;

(3) A1 and A2 are blocked at the top, which means there are no regions above A1 and A2 or the nearest region A3 above A1 and A2 is a blocking region, that is, Lft(A3)≦min(Lft(A1),Lft(A2)), and Rgt(A3)≧max(Rgt(A1),Rgt(A2)); and (4) A1 and A2 are blocked at the bottom, that is, there are no regions below A1 and A2 or the nearest region A3 below A2 and A2 is a blocking region.

If the regions A1, A2 are horizontally connected, their partial order is from the left to the right (from A1 to A2 in FIG. 7).

Figure 8:
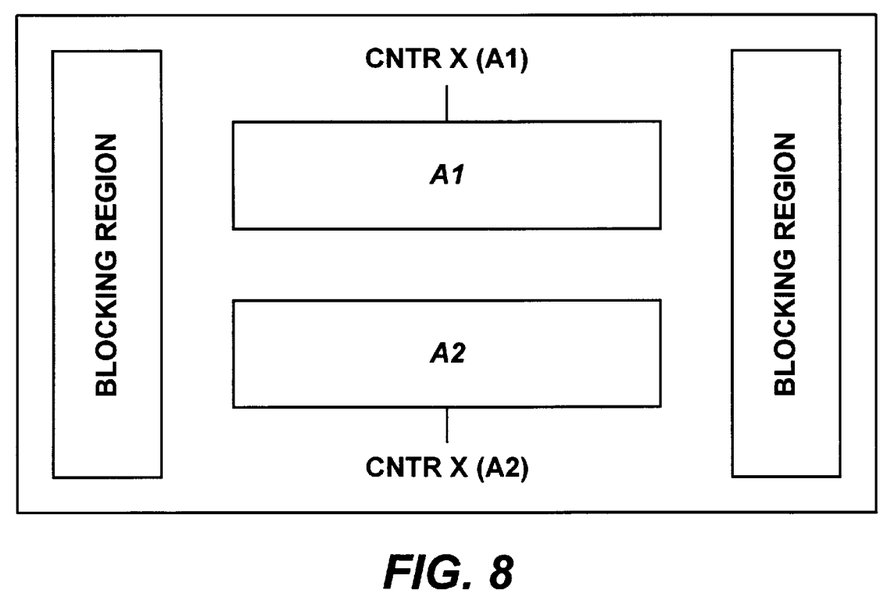

Two text regions A1, A2 are vertically connected (see FIG. 8), if the following conditions are true:

(1) A1 and A2 are vertically aligned; that is, max(Lft(A1),Lft(A2))<min(CntrX(A1),CntrX(A2)), and min(Rgt(A1),Rgt(A2))>max(CntrX(A1),CntrX(A2));

(2) no other region overlaps their common bounding box;

(3) A1 and A2 are blocked at the left, that is, there are no regions at the left or the nearest region A3 at the left is a blocking region, that is, Top(A3)≦min(Top(A1),Top(A2)), and Bot(A3)≧max(Bot(A1),Bot(A2)); and (4) A1 and A2 are blocked at the right; that is, there are no regions at the right or the nearest region A3 at the right is a blocking region.

If the regions A1, A2 are vertically connected, their partial order is from the top to the bottom (from A1 to A2 in FIG. 8).

If a pair of (horizontally or vertically) connected regions A1, A2 is found, the regions are combined into single text region A12. The bounding box of the new region is the smallest rectangle covering both A1 and A2 so that Top(A)=min(Top(A1),Top(A2)), Lft(A)=min(Lft(A1),Lft(A2)), Rgt(A)=max(Rgt(A1),Rft(A2)), and Bot(A)=max(Bot(A1),Bot(A2)).  (Eq. 4)

Other parameters (such as font size and spacing) for the combined region could be transferred from the bigger of regions A1, A2.

The combining process can be repeated until no more connected regions are found.

Figure 9:
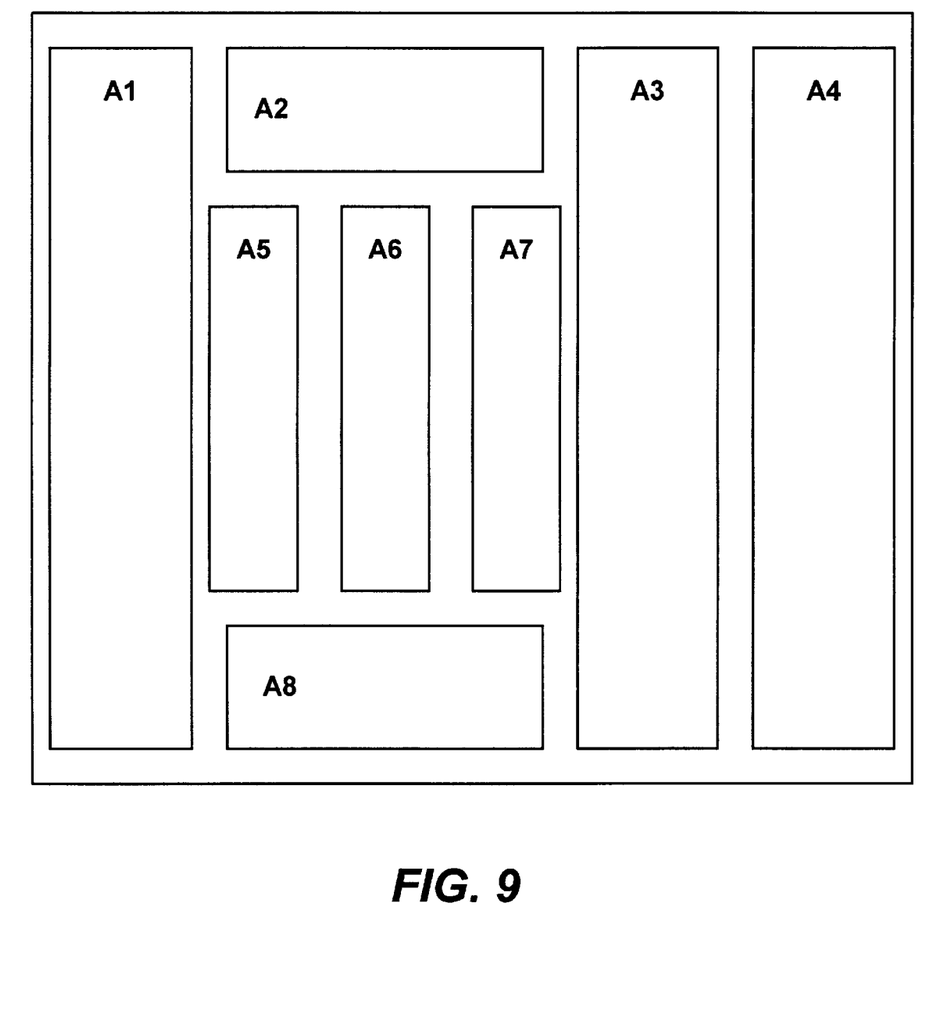

In some cases, the order of the text regions in a page part can be identified just by consecutively combining connected text regions. For example, in the page layout shown in FIG. 9, the solution could be found by combining the text regions as follows:

combine A5 and A6 into A56;

combine A56 and A7 into A567;

combine A2 and A567 into A2567;

combine A2567 and A8 into A25678;

combine A1 and A25678 into A125678;

combine A125678 and A3 into A1256783;

combine A1256783 and A4 into A12567834;

The resultant order of the uncombined text blocks is then A1, A2, A5, A6, A7, A8, A3, and A4.

After all connected text regions are combined, if more than one text region remains in a page part, the order of the regions is determined by solving for the optimal Hamiltonian path of a graph G containing vertices V representing the uncombined text regions.

For K text regions, this is accomplished by first constructing precedence functions $f(Ai,Aj)$, $i \neq j$, $i=1-K$, $j=1-K$, for all the text regions. The precedence functions are used to assign lengths or weights to edges $E_{ij}$ between vertices $V_i$ and $V_j$.

The precedence function is defined as $$f(Ai,Aj)=K_{loc}(Ai,Aj) +K_{dif}(Ai,Aj) +K_{sep}(Ai,Aj),\quad (Eq.\ 5)$$

where $K_{loc}$ evaluates the relative locations of the two text regions Ai and Aj; $K_{dif}$ evaluates the similarity (in number of lines, font size, and spacing) of text regions; and $K_{sep}$ reflects the contribution to the function f due to the existence of a non-text separating region, if any, between Ai and Aj. How $K_{loc}$, $K_{dif}$, and $K_{seq}$ are derived is described below.

A graph G associated with a page part is defined as follows: G is a directed graph with K vertices $V_1, V_2, \ldots, V_k$; each pair of vertices $V_i$, $V_j$, $i \neq j$ is connected by a directed edge $E_{ij}$; a non-negative number $W(E_{ij})$ (referred to as the weight or length of the edge Eij) is assigned to each edge $E_{ij}$:

$$W(E_{ij})=f(Ai,Aj),\quad (Eq.\ 6)$$

where f is the precedence function defined by Eq. 5.

For a given order $\pi$ (which is a permutation of numbers 1, 2, . . . , k), a Hamiltonian path $P(\pi)$ in the graph G is an ordered set of vertices $$P(\pi)=V_1, V_2, \ldots, V_k\quad (Eq.\ 7)$$

The length of the path $P(\pi)$ is defined as $$L(\pi)=W(E_{12})+W(E_{23})+ \ldots +(E_{k-1}k)\quad (Eq.\ 8)$$

The shortest Hamiltonian path is a Hamiltonian path with the minimal value $L(\pi)$.

Each Hamiltonian path $P(\pi)$ in the associated graph G defines an order of text regions in the corresponding page part. As it follows from the definition of the precedence function f, the shorter the Hamiltonian path $P(\pi)$, the greater the likelihood that $\pi$ is the proper logical order of text regions. Therefore, the shortest Hamiltonian path $P(\pi)$ in the graph G provides the solution for finding the order $\pi$ of text blocks in a page part.

To find the shortest Hamiltonian path, the standard method of reducing it to the traveling salesman problem can be used. First, an additional vertex $V_0$ is added to the graph G, with the vertex $V_0$ connected to each vertex $V_j$ by edges $E_{0j}$ and $E_{j0}$. The length of each edge $E_{0j}$ and $E_{j0}$ is defined to be 0, i.e., $W(E_{0j})=W(E_{j0})=0$. Next, a shortest ordered cycle C in the graph G is calculated by applying a standard algorithm for solving traveling salesman problems. The shortest Hamiltonian path is then extracted from the cycle C by removing the additional vertex $V_0$ from the cycle.

Once the logical orders $\pi j$, $j=1n$, corresponding to independent parts $P_1, \ldots, P_n$ in the page have been identified, the paths $\pi j$, are concatenated:

$$\pi=\{\pi_1, \pi_2, \ldots, \pi_n\}\quad Eq.\ 9$$

Since the parts $P_j$ are independent, it does not matter how the orders $\pi_j$ are concatenated. However, an alternative is to sort the parts $P_j$ in increasing order of y and then x where (x,y) is the top, left corner of each page part.

In the concatenated order $\pi$, combined text blocks in text regions are separated out and placed in proper order in a final order $\pi'$. Thus, for example, if $\pi$ is $\{12, 3, 7, 56, 4\}$, it is modified to $\pi'=\{1, 2, 3, 7, 5, 6, 4\}$ to define the order of text blocks A1–A7.

The final order $\pi'$ thus provides the solution for the problem of identifying the order of text blocks in a page.

As set forth in Eq. 5, the precedence functions $f(Ai,Aj)$, $i \neq j$, $i=1-k$, $j=1-k$ are calculated based on values $K_{loc}(Ai,Aj)$, $K_{dif}(Ai,Aj)$, and $K_{sep}(Ai,Aj)$ for k text regions.

A row preference or column preference can be selected. If row preference is selected, then text region ordering favors ordering in the X direction. If column preference is selected, the text region ordering favors ordering in the Y direction. For regions A1=(T1,B1,L1,R1) and A2=(T2,B2,L2,R2), the component $K_{loc}$, which has a value that is dependent upon the relative coordinates of regions A1 and A2, is calculated differently for row and column preferences. Since $K_{loc}$ is dependent on the relative locations of A1 and A2, $K_{loc}$(A1, A2) is calculated differently than $K_{loc}$(A2,A1), with $K_{loc}$ (A1,A2) used to calculate f(A1,A2) and $K_{loc}$(A2,A1) used to calculate f(A2,A1). Generally, because one text region will come before the other region, f(A1,A2) is usually not equal to f(A2,A1) due to the differences in calculating $K_{loc}$(A1, A2) and $K_{loc}$(A2,A1). The calculation of $K_{loc}$(A1,A2) or $K_{loc}$(A2,A1) is set forth below for three possible cases. Since by definition two separate regions do not overlap each other, the case where min(R1,R2)$\geq$max(L1,L2) and min (B1,B2)$\geq$max(T1,T2) is not possible and thus not considered.

In a first case, the text regions A1 and A2 do not overlap either in the X or Y axis and A1 is to the left of and below A2; that is, R1<L2 and T1>B2.

In this case, if column preference is selected, the value $K_{loc}$ is defined as:

$$K_{loc}(A1,A2)=Q1*|CntrX(A1)-CntrX(A2)|, \quad (Eq. 10)$$

where Q1 is a tunable parameter with a default value of 1; and $$K_{loc}(A2,A1)=Q2*|A1,A2|, \quad (Eq. 11)$$

where Q2 is a tunable parameter with default value 2. Thus $K_{loc}(A1,A2)$ has a smaller value than $K_{loc}(A2,A1)$, which tends to favor A1 over A2, which is consistent with the selected column preference.

In the first case, if row preference is selected, the value $K_{loc}$ is defined as:

$$K_{loc}(A1,A2)=Q3*|A1,A2|, \quad (Eq. 12)$$

where Q3 is a tunable parameter with default value 4, and $$K_{loc}(A2,A1)=Q4*|A1,A2|, \quad (Eq. 13)$$

where Q4 is a tunable with default value 1. $K_{loc}(A1,A2)$ has a larger value than $K_{loc}(A2,A1)$, which tends to favor A2 over A1 if row preference is selected in the first case.

In a second case, the boundaries of the text regions A1 and A2 do not overlap in the X axis but may overlap in the Y axis and the region A1 is to the left of region A2; that is, R1<L2 and T1≦B2.

In this case, if column preference is selected, the value $K_{loc}$ is defined as:

$$K_{loc}(A1,A2)=Q1*|CntrX(A1)-CntrX(A2)|, \text{ and} \quad (Eq. 14)$$

$$K_{loc}(A2,A1)=M1, \quad (Eq. 15)$$

where M1 is a large value, which can be set to $$M1=10*max_{i,j}|Ai,Aj|. \quad (Eq. 16)$$

M1 is thus defined as ten times the maximum possible distance between any two text regions in a considered part of the page. Generally, this heavily favors A1 over A2 in the calculation of $K_{loc}$.

In the second case, if row preference is selected, the value $K_{loc}$ is defined as:

$$K_{loc}(A1,A2)=Q4*|A1,A2|, \text{ and} \quad (Eq. 17)$$

$$K_{loc}(A2,A1)=M1, \quad (Eq. 18)$$

where Q4 is tunable with a default value of 1. Again, A1 is generally heavily favored over A2.

In a third case, the boundaries of the text regions do not overlap in the Y axis but overlap in the X axis and A1 is located above A2; that is, B1<T2 and min(R1,R2)≧max(L1,L2).

In this case, for both column and row preferences, the value $K_{loc}$ is defined as:

$$K_{loc}(A1,A2)=Q5*|A1,A2|, \text{ and} \quad (Eq. 19)$$

$$K_{loc}(A2,A1)=M1, \quad (Eq. 20)$$

where Q5 is a tunable parameter with a default value 1. These calculations generally heavily favor A1 over A2.

The function $K_{dif}(A1,A2)$ is defined as $$K_{dif}(A1,A2)=Q6*(m_1+m_2)*(|s_1-s_2|+|l_1-l_2|), \quad (Eq. 21)$$

where $m_i$ is the number of text lines in region Ai, $s_i$ is the text point size for region Ai, $l_i$ is the distance between consecutive lines in Ai, and Q6 is a tunable parameter (default value is 10). In effect, $s_i$ and $l_i$ represent the height (in the Y direction) of a line. $K_{dif}(A2,A1)$ is equal to $K_{dif}(A1,A2)$.

The function $K_{sep}(A1,A2)$ is defined relative to a separator (non-text region) B and is calculated in terms of a horizontal extrusion parameter $E_{hor}(A,B)$ and a vertical extrusion parameter $E_{vert}(A,B)$. For a text region A and separator B, the horizontal extrusion parameter $E_{hor}(A,B)$ is defined as $$E_{hor}(A,B)=max[Lft(A)-Lft(B) \ Rgt(B)-Rgt(A)]/[Rgt(A)-Lft(A)],$$

if $[Lft(B)<Lft(A)$ and $Rgt(B)>Lft(A)]$ or $[Rgt(B)>(Rgt(A)$ and $Lft(B)<Rgt(A)]$;

0, otherwise; (Eq. 22)

Thus, $E_{hor}(A,B)$ is greater than zero if either of the left or right edges of the text region A falls within the range defined by the left and right edges of the separator B.

Similarly, a vertical extrusion parameter $E_{vert}(A,B)$ is defined as $$E_{vert}(A,B)=max[Top(A)-Top(B), Bot(B)-Bot(A)]/[Bot(A)-Top(A)],$$

if $[Top(B)<Top(A)$ and $Bot(B)>Top(A)]$ or $[Bot (B)>Bot(A)$ and $Top(B)<Bot(A)]$;

0, otherwise. (Eq. 23)

The function $K_{sep}(A1,A2)$ is defined as follows for the following two possible cases.

In a first case, the text regions A1, A2 are vertically disjoint; that is, the regions A1, A2 do not overlap in the Y axis, defined by min(Bot(A1)Bot(A2))<max(Top(A1),Top (A2)). In this case, $$K_{sep}(A1,A2)=Q7*\Sigma_B(E_{hor}(A1,B)+E_{hor}(A2,B)), \quad (Eq. 24)$$

where Q7 is a tunable parameter (default can be 10) and the sum $\Sigma_B$ includes all separators between A1 and A2; i.e., Top(B)>min(Bot(A1),Bot(A2)), and Bot(B)<max(Top(A1),Top(A2)).

In a second case, the text regions are horizontally disjoint; that is, the regions A1,A2 do not overlap on the X axis as defined by min(Rgt(A1),Rgt(A2)<max(Lft(A1),Lft(A2)). In this case, $$K_{sep}(A1,A2)=Q7*\Sigma_B(E_{vert}(A1,B)+E_{vert}(A2,B)), \quad (Eq. 25)$$

where the sum $\Sigma_B$ includes all separators between A1 and A2; i.e.,

Lft(B)>min(Rgt(A1),Rgt(A2)), and

Rgt(B)<max(Lft(A1),Lft(A2)).

Once $K_{loc}$, $K_{dif}$ and $K_{loc}$ are calculated for all combinations of A1,A2, ..., Ak, the precedence functions f(Ai,Aj), i≠j, i=1–k, j=1–k, can be constructed and used in finding the lengths of different permutations of paths P(π) to identify the shortest Hamiltonian path P(π).

Figure 10:
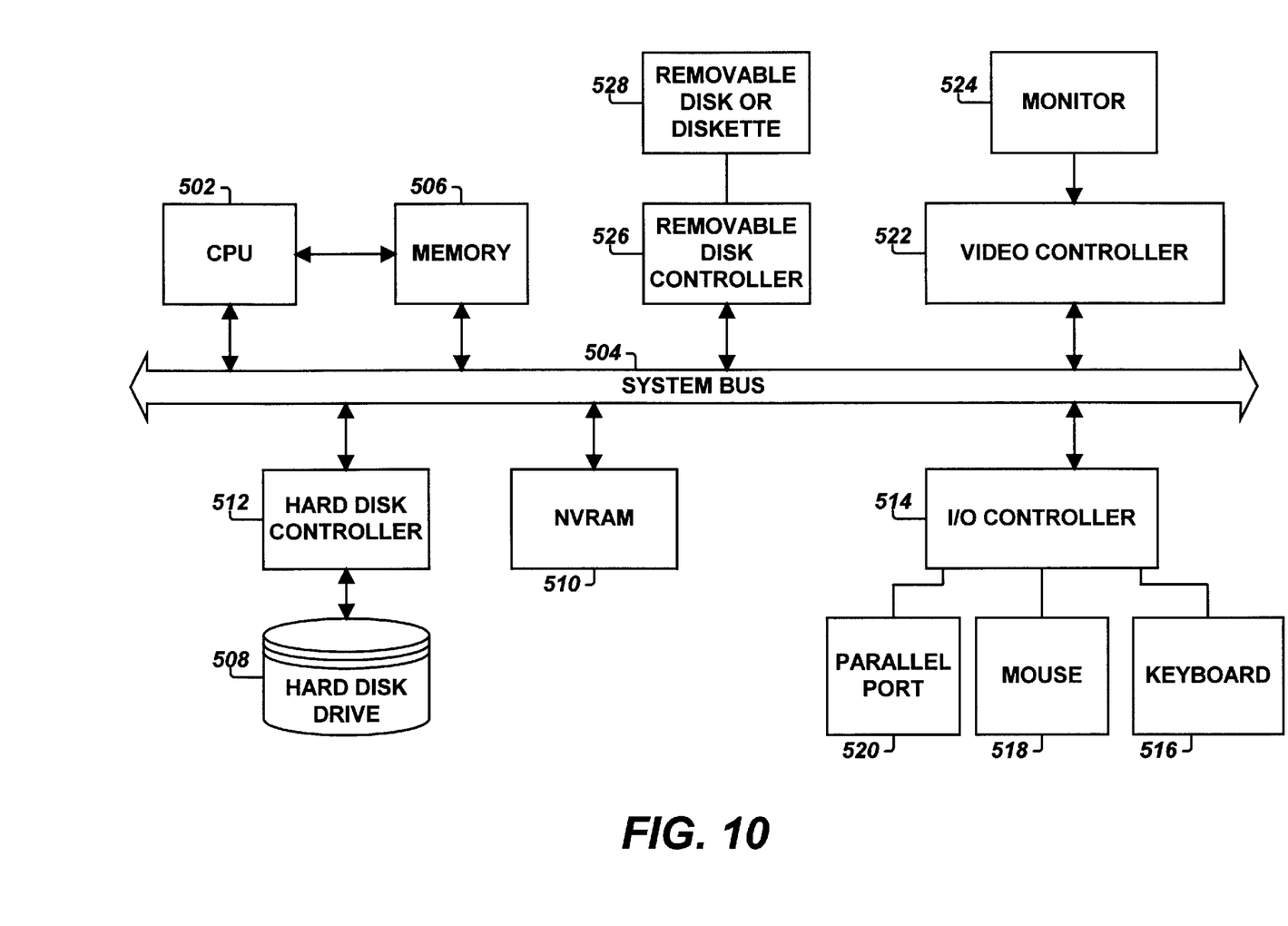
FIG. 10 is a block diagram of a computer system.

Referring to FIG. 10, the text capturing and ordering program may be implemented in digital electronic circuitry or in computer hardware, firmware, software, or in combinations of them, such as in a computer system. The computer system includes a central processing unit (CPU) 502 connected to an internal system bus 504. The storage media in the computer system include a main memory 506 (which can be implemented with dynamic random access memory devices), a hard disk drive 508 for mass storage, and a non-volatile memory (NVRAM) 510. The main memory 506 and NVRAM 510 are connected to the bus 504, and the hard disk drive 508 is coupled to the bus 504 through a hard disk drive controller 512.

Apparatus of the invention may be implemented in a computer program product tangibly embodied in a machine-readable storage device (such as the hard disk drive 508, main memory 506, or NVRAM 510) for execution by the CPU 502. Suitable processors include, by way of example, both general and special purpose microprocessors. Generally, a processor will receive instructions and data from the read-only memory 510 and/or the main memory 506. Storage devices suitable for tangibly embodying computer programming instructions include all forms of non-volatile memory, including by way of example semiconductor memory devices, such as EPROM, EEPROM, and flash memory devices; magnetic disks such as the internal hard disk drive 508 and removable disks and diskettes 528 connected through a controller 526; magneto-optical disks; and CD-ROM disks. Any of the foregoing may be supplemented by, or incorporated in, specially-designed ASICs (application-specific integrated circuits).

The computer system further includes an input-output (I/O) controller 514 connected to the bus 504 and which provides a keyboard interface 516 for connection to an external keyboard, a mouse interface 518 for connection to an external mouse or other pointer device, and a parallel port interface 520 for connection to a printer. In addition, the bus 504 is connected to a video controller 522 which couples to an external computer monitor or display 524. Data associated with an image for display on a computer monitor 524 are provided over the system bus 504 by application programs to the video controller 522 through the operating system and the appropriate device driver.

Other embodiments are within the scope of the following claims. For example, the order of the steps of the invention may be changed by those skilled in the art and still achieve desirable results. Different techniques can be used to identify an optimal path between vertices of a graph representing text blocks or regions in an image. Although specific equations and parameters have been disclosed to determine variables used in finding an optimal order of text blocks or regions, such equations and parameters can be changed.

What is claimed is:

1. A computer-implemented method for ordering text in an image stored in a computer, the text being grouped in multiple blocks, the method comprising:
   grouping the text in multiple regions;
   representing the text regions as a graph having vertices and edges;
   defining each text region as a vertex in the graph;
   defining edges between the vertices in the graph;
   assigning weights to the edges; and
   calculating a shortest Hamiltonian path through the vertices according to the edge weights; and
   ordering the text regions according to the order defined by the calculated shortest Hamiltonian path.

2. The method of claim 1, wherein oriented pairs of edges are defined between any two vertices.

3. The method of claim 1, wherein the step of calculating a shortest Hamiltonian path comprises:
   adding a virtual vertex and virtual oriented edges to the graph;
   obtaining a shortest ordered cycle in the graph by solving a traveling salesman problem on the graph; and
   obtaining the shortest Hamiltonian path by removing the virtual vertex from the shortest ordered cycle.

4. The method of claim 1, wherein the weights assigned the edges between the vertices are based on the distance between corresponding text regions.

5. The method of claim 1, wherein the weights assigned the edges between vertices are based on the text characteristics of the corresponding text regions.

6. The method of claim 5, wherein the text characteristics include font size and number of lines of text.

7. The method of claim 1, wherein the weights assigned the edges between the vertices are based on the existence of non-text separators between text region pairs.

8. The method of claim 7, wherein the separators include graphical objects.

9. The method of claim 1, further comprising:
   identifying text blocks that can be combined; and
   combining the text blocks into a text region.

10. The method of claim 9, wherein two text blocks can be combined if they are vertically connected.

11. The method of claim 9, wherein two text blocks can be combined if they are horizontally connected.

12. The method of claim 1, further comprising:
    initially separating the image into independent parts, each part containing its own set of text regions; and
    performing the actions of grouping, representing, defining, assigning, calculating, and ordering on the text regions in each part independently.

13. The method of claim 12, wherein the image is separated by identifying predetermined types of non-text separators.

14. The method of claim 12, further comprising:
    concatenating the ordering of the text regions identified for the different parts.

15. A program residing on a computer-readable medium for ordering text in an image stored in a computer, the program comprising instructions for causing the computer to:
    group the text in multiple regions;
    represent the text regions as a graph having vertices and edges;
    define each text region as a vertex in the graph;
    define edges between the vertices in the graph;
    assign weights to the edges in the graph; and
    calculate a shortest Hamiltonian path through the vertices according to the edge weights; and
    order the text regions according to the order defined by the calculated shortest Hamiltonian path.

16. The program of claim 15, wherein the weights assigned the edges between the vertices are based on the distance between corresponding text blocks and the characteristics of each block.

17. The program of claim 15, wherein the weights assigned the edges between the vertices are based on the existence of separators between the text block pairs.

18. The program of claim 15, wherein the program comprises instructions for further causing the computer to:
    identify blocks of text that can be combined; and
    combine the text blocks into a text region.

19. The program of claim 15, wherein the program comprises instructions for further causing the computer to:
    initially separate the image into independent parts, wherein each part contains its own set of text regions; and
    separately perform the actions of grouping, representing, defining assigning calculating, and ordering the text regions in each independent part.

20. The program of claim 19, wherein the program comprises instructions for further causing the computer to concatenate the ordering of text regions identified for the independent parts.

21. Apparatus for recognizing text in an image, comprising:
- a storage medium to store the image; and
- a processor operatively coupled to the storage medium and configured to:
  - group the text in multiple regions;
  - represent the text regions in a graph having vertices and edges;
  - define each text region as a vertex in the graph;
  - define edges between the vertices in the graph;
  - assign weights to the edges in the graph; and
  - calculate a shortest Hamiltonian path through the vertices according to the edge weights; and
  - order the text regions according to the order defined by the calculated shortest Hamiltonian path.

22. The apparatus of claim 21, wherein the weights assigned the edges between the vertices are based on the distance between any two text regions.

23. The apparatus of claim 21, wherein the weights assigned the edges between the vertices are further based on the existence of separators between the text block pairs.

24. A method implemented in a computer for ordering text in an image stored in the computer, the method comprising:
- identifying a set of text blocks;
- separating the set of text blocks into independent subsets of text blocks;
- representing the text blocks as vertices in a graph in each subset;
- defining directed edges between vertices in each subset;
- assigning weights to the directed edges;
- calculating a shortest Hamiltonian path through the graph in each subset according to the edge weights;
- ordering the text blocks in each subset according to the order defined by the calculated shortest Hamiltonian path; and
- concatenating the ordering of text blocks in the subsets into a final order.

* * * * *

UNITED STATES PATENT AND TRADEMARK OFFICE
CERTIFICATE OF CORRECTION

PATENT NO.   : 6,175,844 B1                                                Page 1 of 1
DATED        : January 16, 2001
INVENTOR(S)  : Jacob Stolin It is certified that error appears in the above-identified patent and that said Letters Patent is hereby corrected as shown below:

Column 6,
Line 3, please delete "$...+(E_{k-1}k)$" and insert therefor -- $...+W(E_{k-1}k)$ --.

Column 8,
Line 11, after "$E_{hor}(A,B)=\max[\mathrm{Lft}(A)-\mathrm{Lft}(B)$" please insert therefore -- , --.
Line 13, after the word "or" please delete "$[\mathrm{Rgt}(B)>(\mathrm{Rgt}(A)$" and insert therefore -- $[\mathrm{Rgt}(B)>\mathrm{Rgt}(A)$ --.

Signed and Sealed this

Fifth Day of March, 2002

*Attest:*

*Attesting Officer*

JAMES E. ROGAN
*Director of the United States Patent and Trademark Office*